United States Patent [19]

Mischel

[11] 4,090,726

[45] May 23, 1978

[54] FLEXIBLE COUPLING FOR CONDUITS

[76] Inventor: Howard T. Mischel, c/o Pathway Bellows, Inc., Callahan Mining Corporation, Box 1526, El Cajon, Calif. 92022

[21] Appl. No.: 760,114

[22] Filed: Jan. 17, 1977

[51] Int. Cl.² ............................................. F16L 27/02
[52] U.S. Cl. .................................... 285/229; 285/236
[58] Field of Search ................ 285/236, 229, 226, 53, 285/223, 224, 235

[56] References Cited

U.S. PATENT DOCUMENTS

| | | | |
|---|---|---|---|
| 1,263,953 | 4/1918 | Smyth | 285/229 |
| 3,460,856 | 8/1969 | Vantine et al. | 285/53 |
| 3,633,946 | 1/1972 | Kazmierski | 285/229 |
| 3,730,566 | 5/1973 | Kazmierski et al. | 285/229 |
| 3,874,711 | 4/1975 | Scalzo | 285/236 |
| 3,997,194 | 12/1976 | Eifer et al. | 285/53 |

Primary Examiner—George H. Krizmanich

[57] ABSTRACT

A flexible expansion joint suitable for connecting the spaced ends of two conduits which convey relatively hot fluid and solid particle streams and which expand and contract generally axially toward and away from each other with some lateral motion as well. The joint includes frame members connected to the ends of the conduits extending outwardly from the conduits with horizontal portions spaced from the conduits. The joint also includes one or more layers of flexible belt-like material resting upon the horizontal portions and fastened thereto. The joint also includes a pair of baffle-like members attached to each conduit, extending interiorly and preferably bridging the space between the ends of the conduits.

7 Claims, 5 Drawing Figures

FLEXIBLE COUPLING FOR CONDUITS

BACKGROUND OF THE INVENTION

These fabric expansion joints have certain advantages in the connection of the ends of large conduits usually designed to convey gases, sometimes accompanied by solid particles. For example, they may carry the combustion discharge from a heating fire to apparatus designed to remove noxious vapors and solids prior to discharging the remainder to the atmosphere.

The conduits used for this purpose are metallic and usually large. The fluids passing therethrough are subject to variations in temperature causing expansion and contraction of the conduits; hence there is variation of the space between the ends of conduits which must be connected. A desirable way of connecting the ends of such conduits is by way of a flexible belt usually comprising a plastic fabric or unwoven material, but sometimes utilizing a metallic belt of woven material such as asbestos or the like. In the past such belts were first directly connected to the peripheries of the conduits by bolting or other fastening arrangements.

The difficulties encountered with this arrangement are due to unusually high temperatures of the materials being conveyed in the conduits which rapidly deteriorate many materials which would otherwise be highly desirable for use in such connecting belts. In the past attempts have been made to protect such belting by placing a plurality of layers of temperature resistant material between the open ends of the conduits and beneath the interior surface of the belts but this greatly increases the cost of the joint and frequently still does not solve the problem.

An example of this kind of expansion joint is shown in U.S. Pat. No. 3,460,856 wherein the outer belt is protected by a plurality of layers of material such as woven asbestos cloth protected by metal mesh covering material and supported in a suspended position by fingers. Not only is the use of such complex arrangement expensive but it does not solve the problem of unduly heating the portions of the outer belt, particularly in the areas of connection with the conduits where such heating causes great damage to the outer belt.

The present invention eliminate all of this complexity in a simple fashion. The outer belt, which may comprise one or more layers is suspended away from the open ends of the ducts with a baffling arrangement comprising overlapping axially spaced baffle members. This not only greatly improves the joint by way of simplification but also substantially reduces the temperature at the inner surface of the belt and particularly at its connecting points.

There is not only the heat problem which these expansion joints have to contend with. Continuing the combustion discharge analogy this material from the fire contains solids such as fly ash. These expansion joints extend completely around the conduits, which are usually squarish thus roughly three quarters of the joint is exposed to gravitational forces; this is roughly the bottom and the sides. Solid particles in the combustion fluid, such as fly ash, tend to impinge on the joint and be caught there, thus building up an accumulation of such solids. This is so even where the surface of the belt in the joint is substantially contiguous with the surface of the conduits as shown in the joint of U.S. Pat. No. 3,552,776. In that joint there is no obstruction to impingement of the solids and deterioration of the belts.

Even with the baffle shown in U.S. Pat. No. 3,460,856 there is an opening between the baffle and the downside of the joint. In such structure there is a tendency for these solid particles to entrap the space between the baffle and the belt.

In the construction of the present invention the incoming material from the up-stream conduit is diverted by the baffling arrangement. As it flows by the opening between the two baffles, some of it is diverted upwardly and through the opening between the baffles and eddy currents are set up which tend to whirl through the space between the belt and baffles. The whirling action of these eddy currents keeps the solid particles alive and whirling around with the gases. They eject with the ejecting fluid and hence the joint is constantly cleansing itself of these solids. Also, the spacing of the belt from the main stream in the conduits and the whirling action referred to substantially reduces the temperature of the material contacting the belt. It should also be pointed out that because the opening between the baffles is down stream there is less tendency for the fluids and solids to reverse direction and flow into the space between the baffles and the belt. The material that does so flow moves slowly and therefore has more time to cool before contacting the belt.

An object of the present invention is to provide an expansion joint for the ends of conduits carrying hot fluid gases containing solid particles which will withstand high temperatures and inhibit the deposition of the solid particles within the joint structure.

Another object of the present invention is to provide an expansion joint which may utilize successfully flexible material unable to withstand temperatures of the gases flowing through the conduits if they came in direct contact with such gases.

Finally it is an object of this invention to provide a fabric expansion joint which has all the advantages innate in such joints and yet may utilize materials which would deteriorate rapidly if used in various prior art structures.

Other objects, advantages and salient features of the present invention will be apparant and readily understood from the following description of the invention:

In the drawings

Similar reference characters refer to similar parts throughout the several views of the drawings.

As previously mentioned the expansion joint of this invention is primarily for use in covering the open ends of large conduits. Such conduits may carry a variety of fluids, sometimes intermixed with solids and they may be located where the outside temperature varies considerably and departs materially from the temperature of the fluid material in the conduits. The basic belt may be an elastomer coated were reinforced asbestos cloth. This coated cloth provides in effect a flexible gas seal. Depending upon the temperature of the material being conveyed by the conduits, the belting assembly may contain layers of soft fiberglass insulation and wire reinforced asbestos cloth. There are four basic elastomers which may be used in a range roughly running from −50° to 500° F.. These are chloroprene synthetic rubber, chlorosulfonated polyethylene rubber, silicone rubber and fluoroelastomer. The asbestos cloth may be reinforced with inconel wire inserted into each strand while its interior surface is preferably sprayed with an aluminized coating for radiation reflection. Other material which may be best suited to particular applications of the joint may be used.

As noted one of the important uses of these joints is in conducting combustion exhaust fluid material from fires to cleansing and separating apparatus. For example, in large power plants the conduits assume rather large proportions usually in squarish form. In size they may range as high as twenty feet or more and the fluid material passing therethrough comprises gases, many of which are noxious and corrosive, mixed with solid particles, such as fly ash and other materials. Such conduits are subject to relatively high temperatures. Variation in temperatures causes substantial contraction and expansion of the conduits mainly axially but to some extent laterally. Inasmuch as the sides and bottoms of the joint, particularly the bottom portion, are subject to contamination by the solid materials such as fly ash, these tend to collect in the joint. In a period of time they may form cake-like masses which impede the expansion and contraction characteristics of the joint and also lead to attacks on the flexible material used in the joints. It is thus highly desirable to provide a joint which is not only resistant to fluxuation in temperature but also inhibits the collection of solid materials in the joint structure.

Figure 1:
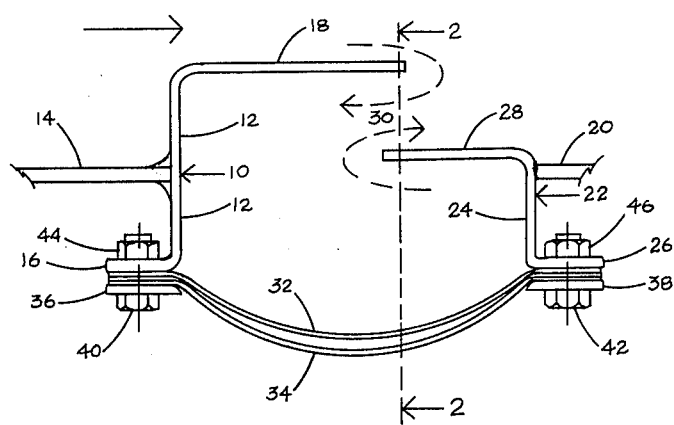
FIG. 1 is a vertical section taken through the bottom portion of the expansion joint of this invention.
Figure 2:
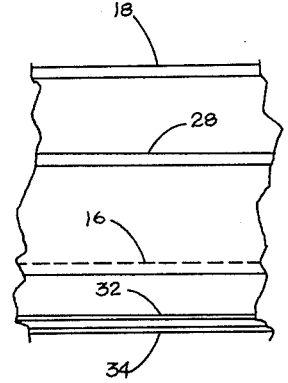
FIG. 2 is a vertical section of the expansion joint taken along the lines 2—2 of FIG. 1.

Referring now to FIG. 1 the frame member generally indicated at 10 includes a vertical portion 12 which is spot welded to one end of the conduit 14. The vertical portion 12 extends outwardly from the conduit 14 to a horizontal portion 16 which is roughly parallel to the conduit 14 and the axis thereof. The vertical portion 12 of frame member 10 also extends into the conduit to form a baffling arrangement, again substantially at right angles to its axis to a horizontal portion 18 which extends substantially parallel with the axis and spans part of the space between the two conduits.

The end of the other conduit 20 has spot welded thereto another frame member generally indicated at 22 having a vertical portion 24 extending away from conduit 20 and a horizontal portion 26 preferably substantially parallel with the horizontal portions 16 of frame member 10. Frame member 22 also has a horizontal portion 28 forming a baffling arrangement extending toward the end of conduit 14. Horizontal portion 28 is also substantially parallel with the axis of conduit 20 and the horizontal portion 18 of frame member 10. Preferably the ends of horizontal portions 18 and 28 overlap so that the entire opening between conduits 14 and 20 is spanned by the two frame members 10 and 22, leaving a continuous space 30 between horizontal portions 18 and 28, contiguous with but spaced inwardly in the conduit.

Figure 3:
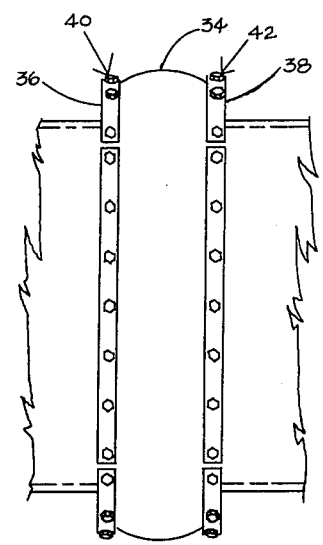
FIG. 3 is a fragmentary elevational view of the expansion joint as viewed from the outside

One or more belts, here shown illustratively as belts 32 and 34, span the space between frame members 10 and 22 and space horizontal portions 16 and 26. Back-up bars 36 and 38, also shown in FIG. 3, fit against the portions of the belts 32 and 34 on horizontal portions 16 and 26, preferably surrounding the belts 32 and 34. Nuts and bolts generally indicated at 40 and 42 clamp the back-up bars 36 and 38 and the edge portions of the belts 32 and 34 to the horizontal portions 16 and 26 which, when tightened, provide a hermetic seal preventing escape of gases from the joint.

Now, understanding that the material in the conduits is traveling in the directions of the arrow in FIG. 1, as it passes the right end of horizontal portion 18 of frame member 10, as portion of it (see arrows) travels into the space 30 between horizontal portions 18 and 28 into the space bridged by belts 32 and 34. This creates in this space eddy currents and a slow swirling action as the gases and particles travel about. The velocity of the material is reduced and it cools before contacting belt 32 (FIG. 1) and tends to push material already therein out (see arrows) through opening 39 to be carried away with the main stream in the conduit 20. Thus this action constantly cleanses the joint and inhibits buildup of solid materials with their adverse effect on the joint. Accordingly, this cooling and cleansing action offers considerable protection and adds to the longevity of belts 32 and 34.

Figure 4:
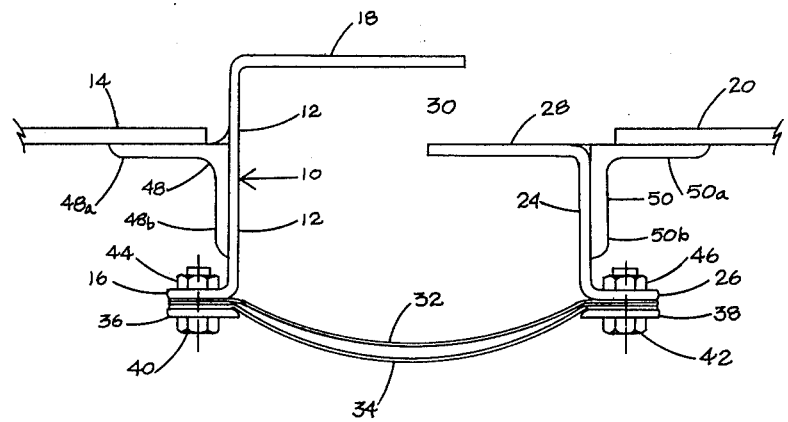
FIG. 4 is a sectional view similar to FIG. 1 of an expansion joint comprising another embodiment of this invention and FIG. 5 is a sectional view similar to FIG. 1 of an expansion joint comprising a further embodiment of this invention.

Referring to FIG. 4 there is shown another embodiment of the invention wherein the expansion joint is similar to that shown in FIG. 1. Hence the same reference characters are used therein. Here, however, there are right angle bars 48 and 50 having horizontal portions 48a and 50a attached to the conduits 14 and 20 as by welding or other fastening means and vertical portions 48b and 50b similarly attached to vertical portions 12 and 24 of the frame members 10 and 22. In some applications this structure is desirable in that it adds greater strength to the expansion joint.

Figure 5:
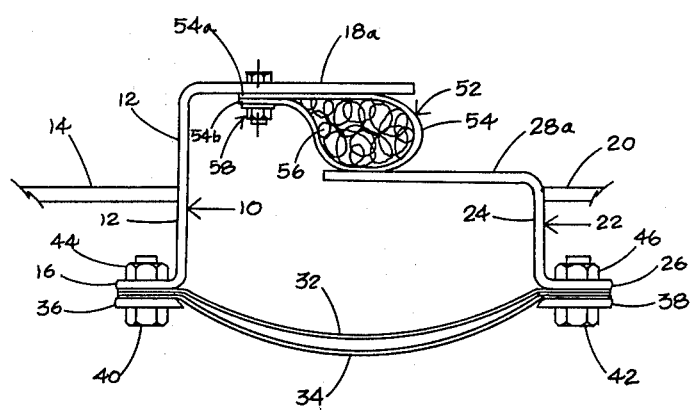

A further embodiment of the invention is shown in FIG. 5 where the expansion joint is similar to that shown in FIG. 1. Hence, the same reference characters are used therein with additional structure identified as needed. In this embodiment there is a rope-like structure generally indicated at 52 resting between horizontal portions 18a and 28a. In this instance horizontal portions 18a and 28a are longer to overlap each other for a greater distance to accomodate rope-like structure 52. Rope-like structure 52 includes an outer cover 54 which may comprise, for example, aluminized asbestos cloth stuffed with soft fiberglass insulation 56. The overlapping ends 54a and 54b of cover 54 are bolted to horizontal portion 18a by a nut and bolt generally indicated at 58. Rope-like structure 52 preferably blocks space 30 fending off the fluids and solids flowing in the conduits. Because this structure is soft and pliable it allows horizontal portions 18a and 28a to move toward each other or in parallel directions to accomodate expansion and contraction caused by variable temperatures of the materials passing through the conduits as well as outside temperature changes. Not only does rope-like structure 52 block materials from entering the space adjacent belt 32 but it also reduces temperatures which belts 32 and 34 are subject to during operation.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, What I claims as new and desire to secure by Letters Patent is:

1. A flexible expansion joint for connecting the spaced ends of two conduits for conveying a high temperature fluid stream in one direction and which expand and contract axially toward and away from each other and also move laterally and radially with respect to each other including frame members attached to the end portions of each conduit and extending away from the perhiers of the conduits and a flexible belt-like structure connected to the outer portions of said frame members to bridge the space between the ends of said conduits while being radially spaced outwardly from said space, between the ends of said conduits the combination of:

baffling mechanism attached to at least one of said conduits and bridging the space therebetween and extending downstream toward the axis of said conduits, said baffling mechanism including radially spaced portions to form a continuous space therebetween facing away from said stream, whereby said frame members, said belt-like structure and said baffling mechanism form an enclosure except for said continuous space and means forming a flexible obstruction spanning said continuous space and attached to said baffling mechanism.

2. The expansion joint defined in claim 1 wherein said baffling mechanism includes overlapping horizontal portions to form said continuous space with said flexible obstruction therebetween.

3. The expansion joint defined in claim 2 wherein said flexible obstruction is a rope-like structure of temperature resistant material interposed between said horizontal portions.

4. The expansion joint defined in claim 3 wherein said rope-like structure comprises a cover of heat resistant material such as aluminized asbestos cloth stuffed with soft heat insulating material such as fiberglass, whereby the rope-like structure fills said continuous space and yet yields to the relative movement of said overlapping horizontal portions.

5. A flexible expansion joint for connecting the spaced ends of two conduits for conveying high-temperature fluid streams in one direction, said conduits being expansible and contractible axially toward and away from each other and also moveable radially or laterally with respect to each other, all under the influence of a variety of temperature changes in said streams, said conduits and various portions of said joint, the combination of:

frame members attached to the end portions of each conduit and having vertical portions extending substantially away from the peripheries of said conduits and horizontal flange portions extending away from said vertical portions and from the ends of said conduits and radially spaced outwardly from said peripheries, a flexible, heat-resistant belt-like sructure whose opposite edge portions rest exclusively on said horizontal flange portions and which bridges the space between the ends of said conduits while being radially spaced outwardly from said stream and means fastening said edge portions of said belt-like structure to said horizontal flange portions of said frame members, whereby the temperature of the fluid contacting said beltlike structure is substantially below that of the fluid in said stream flowing through said conduits and the temperature of said horizontal flange portions of said frame members engaging said belt-like structure is substantially below the temperature of said conduits.

6. The combination defined in claim 5 wherein there is baffling means substantially bridging the space between the ends of said conduits and spaced inwardly from the inner surfaces of said conduits.

7. The combination defined in claim 6 wherein said baffling means includes overlapping horizontal axially spaced sections to provide a continuous space therebetween.

* * * * *